US012562865B2

(12) United States Patent
Xu et al.

(10) Patent No.: US 12,562,865 B2
(45) Date of Patent: Feb. 24, 2026

(54) PDSCH DMRS DESIGN FOR PHASE COHERENT BUNDLING

(71) Applicant: QUALCOMM Incorporated, San Diego, CA (US)

(72) Inventors: Huilin Xu, Temecula, CA (US); Hwan Joon Kwon, San Diego, CA (US); Krishna Kiran Mukkavilli, San Diego, CA (US); Jing Lei, San Diego, CA (US); Yuchul Kim, San Diego, CA (US); Chao Wei, Beijing (CN); Hung Dinh Ly, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 484 days.

(21) Appl. No.: 17/925,790

(22) PCT Filed: Jul. 21, 2020

(86) PCT No.: PCT/CN2020/103269
§ 371 (c)(1),
(2) Date: Nov. 16, 2022

(87) PCT Pub. No.: WO2022/016369
PCT Pub. Date: Jan. 27, 2022

(65) Prior Publication Data
US 2023/0179369 A1      Jun. 8, 2023

(51) Int. Cl.
H04L 5/00          (2006.01)
(52) U.S. Cl.
CPC ................................. H04L 5/0051 (2013.01)

(58) Field of Classification Search
None
See application file for complete search history.

(56) References Cited

U.S. PATENT DOCUMENTS

2016/0037491 A1      2/2016  Hwang et al.
2017/0288835 A1*    10/2017  Kim ..................... H04L 5/0048
(Continued)

FOREIGN PATENT DOCUMENTS

CA          3067322 A1    12/2018
CN          110731071 A     1/2020
WO        2020256903 A1    12/2020

OTHER PUBLICATIONS

Supplementary European Search Report—EP20946517—Search Authority—The Hague—Apr. 2, 2024.
(Continued)

*Primary Examiner* — Diane L Lo
(74) *Attorney, Agent, or Firm* — Procopio, Cory, Hargreaves & Savitch

(57)          ABSTRACT

A configuration that enables a UE to process a PDSCH DMRS bundle having a higher density of DMRS symbols at a beginning of the PDSCH DMRS bundle. The apparatus receives a PDSCH and DMRS in each slot of a plurality of slots, the DMRS being bundled across the plurality of slots, a first subset of slots of the plurality of slots each having a higher DMRS symbol density of DMRS than a second subset of slots of the plurality of slots, the second subset of slots being subsequent to the first subset of slots. The apparatus decodes each received PDSCH based on at least a subset of the received DMRS.

35 Claims, 11 Drawing Sheets

(56) References Cited

U.S. PATENT DOCUMENTS

| | | | |
|---|---|---|---|
| 2017/0366377 A1* | 12/2017 | Papasakellariou | .... H04L 5/0053 |
| 2019/0103941 A1 | 4/2019 | Seo et al. | |
| 2019/0159181 A1* | 5/2019 | Manolakos | .......... H04W 72/23 |
| 2019/0222380 A1 | 7/2019 | Manolakos et al. | |
| 2019/0260454 A1* | 8/2019 | Lindbom | ................. H04L 5/10 |
| 2020/0146035 A1 | 5/2020 | Kim et al. | |
| 2020/0170076 A1 | 5/2020 | Saito et al. | |

OTHER PUBLICATIONS

International Search Report and Written Opinion—PCT/CN2020/103269—ISA/EPO—Apr. 20, 2021.

Qualcomm: "Remaining Issues on NR DM-RS", R1-1716783, 3GPP TSG RAN WG1 Meeting NR#3, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18-21, 2017, Sep. 25, 2017 (Sep. 25, 2017), 30 Pages, XP051353912, 4.5.2 DL DMRS bundling in time domain, The Whole Document.

Qualcomm Incorporated: "Evaluation of DL DMRS design", R1-1708598, 3GPP TSG RAN WG1 Meeting #89, Hangzhou, China, May 15-19, 2017, May 7, 2017, pp. 1-38.

* cited by examiner

412 PDSCH DMRS RE

414 PDSCH data RE

410

412

414

400

402 Mode 1

404 Mode 2 ...

406 408

PDSCH DMRSs are bundled in this window 416

PDSCH DMRSs are bundled in this window 416

418 UE receives a PDCCH indicating the bundling starts here

PDSCH symbol with DMRS 406

PDSCH symbol without DMRS 408

Figure 8:
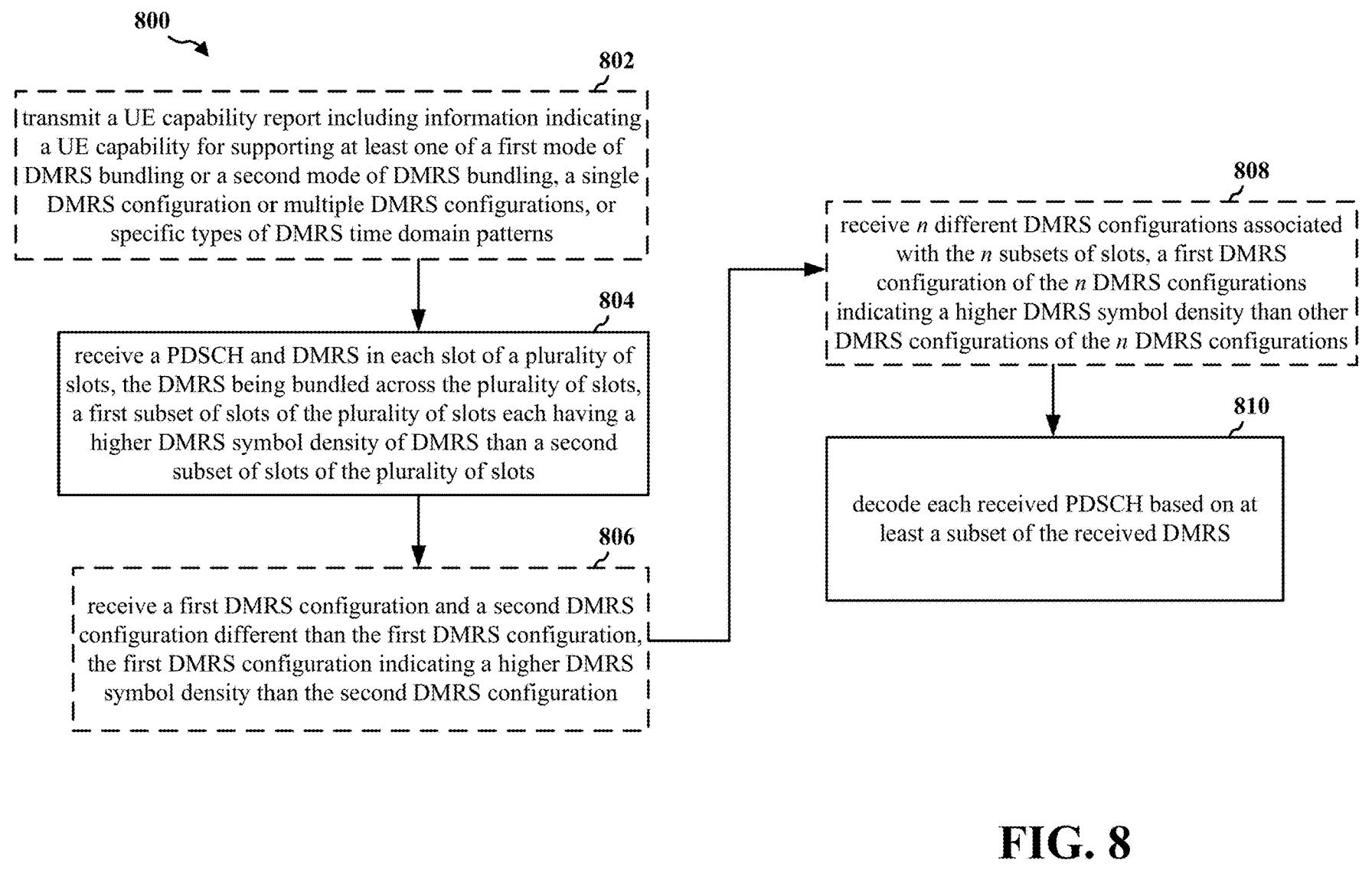

800

802 transmit a UE capability report including information indicating a UE capability for supporting at least one of a first mode of DMRS bundling or a second mode of DMRS bundling, a single DMRS configuration or multiple DMRS configurations, or specific types of DMRS time domain patterns

804 receive a PDSCH and DMRS in each slot of a plurality of slots, the DMRS being bundled across the plurality of slots, a first subset of slots of the plurality of slots each having a higher DMRS symbol density of DMRS than a second subset of slots of the plurality of slots

806 receive a first DMRS configuration and a second DMRS configuration different than the first DMRS configuration, the first DMRS configuration indicating a higher DMRS symbol density than the second DMRS configuration

808 receive n different DMRS configurations associated with the n subsets of slots, a first DMRS configuration of the n DMRS configurations indicating a higher DMRS symbol density than other DMRS configurations of the n DMRS configurations

810 decode each received PDSCH based on at least a subset of the received DMRS

1002 receive a UE capability report including information indicating a UE capability for supporting at least one of a first mode of DMRS bundling or a second mode of DMRS bundling, a single DMRS configuration or multiple DMRS configurations, or specific types of DMRS time domain patterns

1004 determine to transmit bundled DMRS in a plurality of slots to a UE

1006 transmitting a PDSCH and the DMRS in each slot of the plurality of slots, the DMRS being bundled across the plurality of slots, a first subset of slots of the plurality of slots each having a higher DMRS symbol density of DMRS than a second subset of slots of the plurality of slots

1008 transmit a first DMRS configuration and a second DMRS configuration different than the first DMRS configuration, the first DMRS configuration indicating a higher DMRS symbol density than the second DMRS configuration

1010 transmit $n$ different DMRS configurations associated with the $n$ subsets of slots, a first DMRS configuration of the $n$ DMRS configurations indicating a higher DMRS symbol density than other DMRS configurations of the $n$ DMRS configurations

1

PDSCH DMRS DESIGN FOR PHASE COHERENT BUNDLING

CROSS REFERENCE TO RELATED APPLICATION(S)

This application is a National Stage Application filed under 35 U.S.C. § 371 of PCT International Application No. PCT/US2020/103269, entitled "PDSCH DMRS DESIGN FOR PHASE COHERENT BUNDLING" filed Jul. 21, 2020, which is incorporated herein by reference in its entirety.

BACKGROUND

Technical Field

The present disclosure relates generally to communication systems, and more particularly, to a configuration for physical downlink shared channel (PDSCH) demodulation reference signals (DMRS) for phase coherent bundling.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives a physical downlink shared channel (PDSCH) and demodulation reference signals (DMRS) in each slot of a plurality of slots, the DMRS being bundled across the plurality of slots, a first subset of slots of the plurality of slots each having a higher DMRS symbol density of DMRS than a second subset of slots of the plurality of slots, the second subset of slots being subsequent to the first subset of slots. The apparatus decodes each received PDSCH based on at least a subset of the received DMRS.

In an aspect of the disclosure, a method, a computer-readable medium, and an apparatus are provided. The apparatus may be a device at a base station. The device may be a processor and/or a modem at a base station or the base station itself. The apparatus determines to transmit bundled demodulation reference signals (DMRS) in a plurality of slots to a UE. The apparatus transmits a physical downlink shared channel (PDSCH) and the DMRS in each slot of the plurality of slots, the DMRS being bundled across the plurality of slots, a first subset of slots of the plurality of slots each having a higher DMRS symbol density of DMRS than a second subset of slots of the plurality of slots, the second subset of slots being subsequent to the first subset of slots.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a flowchart of a method of wireless communication.

FIG. 10 is a flowchart of a method of wireless communication.

DETAILED DESCRIPTION

Figure 1:
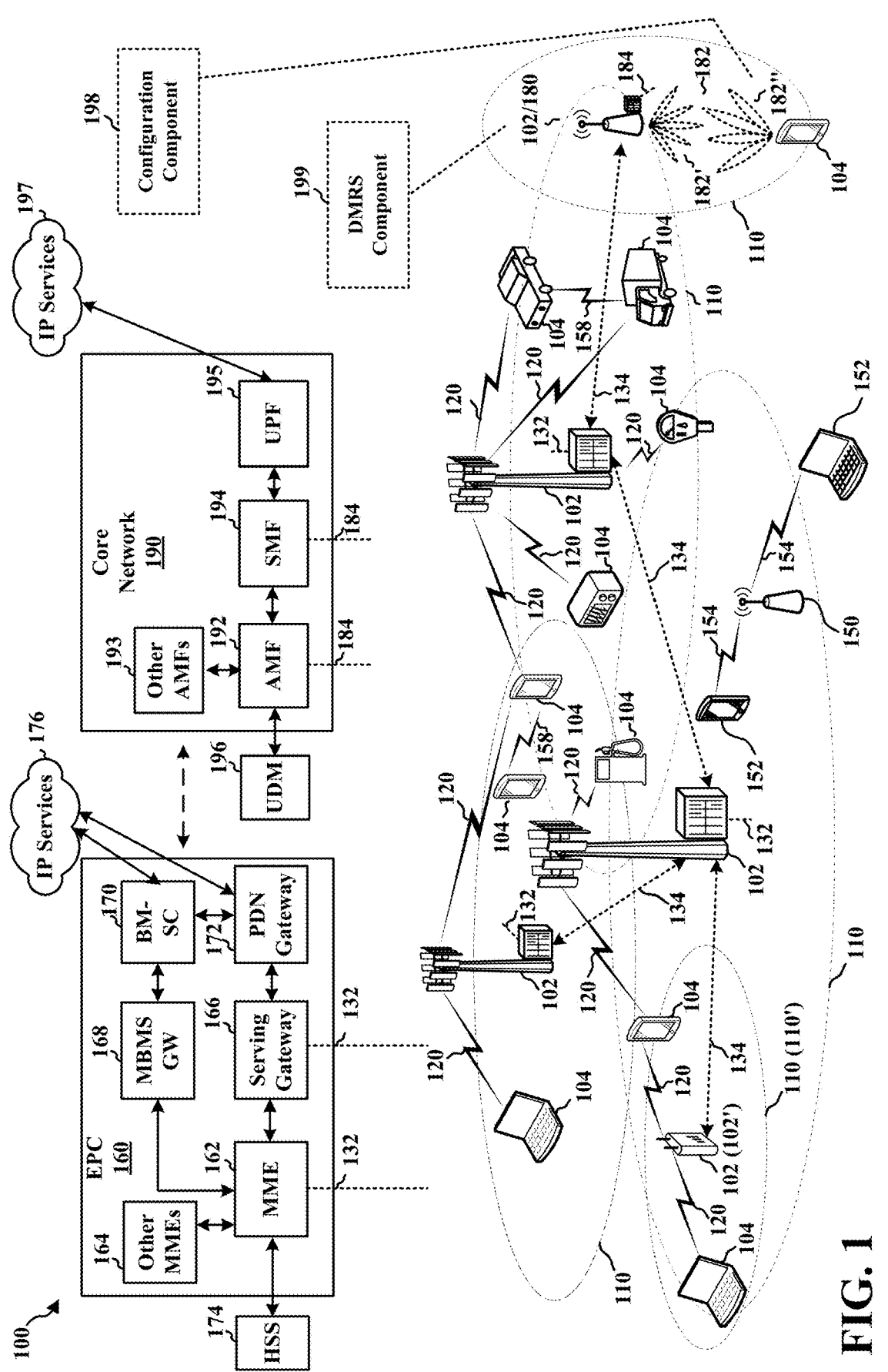
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a sub-scriber unit, a wireless unit, a remote unit, a mobile device, a wireless device, a wireless communications device, a remote device, a mobile subscriber station, an access termi-nal, a mobile terminal, a wireless terminal, a remote termi-nal, a handset, a user agent, a mobile client, a client, or some other suitable terminology.

Referring again to FIG. 1, in certain aspects, the UE 104 may be configured to process a PDSCH DMRS bundle having a higher density of DMRS symbols at a beginning of the PDSCH bundle. For example, the UE 104 may comprise a configuration component 198 configured to receive one or more different DMRS configurations where a first DMRS configuration includes a higher DMRS symbol density than a second DMRS configuration. The UE 104 receives a PDSCH and DMRS in each slot of a plurality of slots, the DMRS being bundled across the plurality of slots, a first subset of slots of the plurality of slots each having a higher DMRS symbol density of DMRS than a second subset of slots of the plurality of slots, the second subset of slots being subsequent to the first subset of slots. The UE 104 decodes each received PDSCH based on at least a subset of the received DMRS.

Referring again to FIG. 1, in certain aspects, the base station 180 may be configured to provide a UE with a PDSCH DMRS bundle having a higher density of DMRS symbols at a beginning of the PDSCH DMRS bundle. For example, the base station 180 may comprise a DMRS component 199 configured to determine to transmit bundled DMRS in a plurality of slots to a UE. The base station 180 determines to transmit bundled DMRS in a plurality of slots to a UE. The base station 180 transmits a PDSCH and the DMRS in each slot of the plurality of slots, the DMRS being bundled across the plurality of slots, a first subset of slots of the plurality of slots each having a higher DMRS symbol density of DMRS than a second subset of slots of the plurality of slots, the second subset of slots being subsequent to the first subset of slots.

Although the following description may be focused on 5G NR, the concepts described herein may be applicable to other similar areas, such as LTE, LTE-A, CDMA, GSM, and other wireless technologies.

Figures 2A, 2B, 2C, 2D:
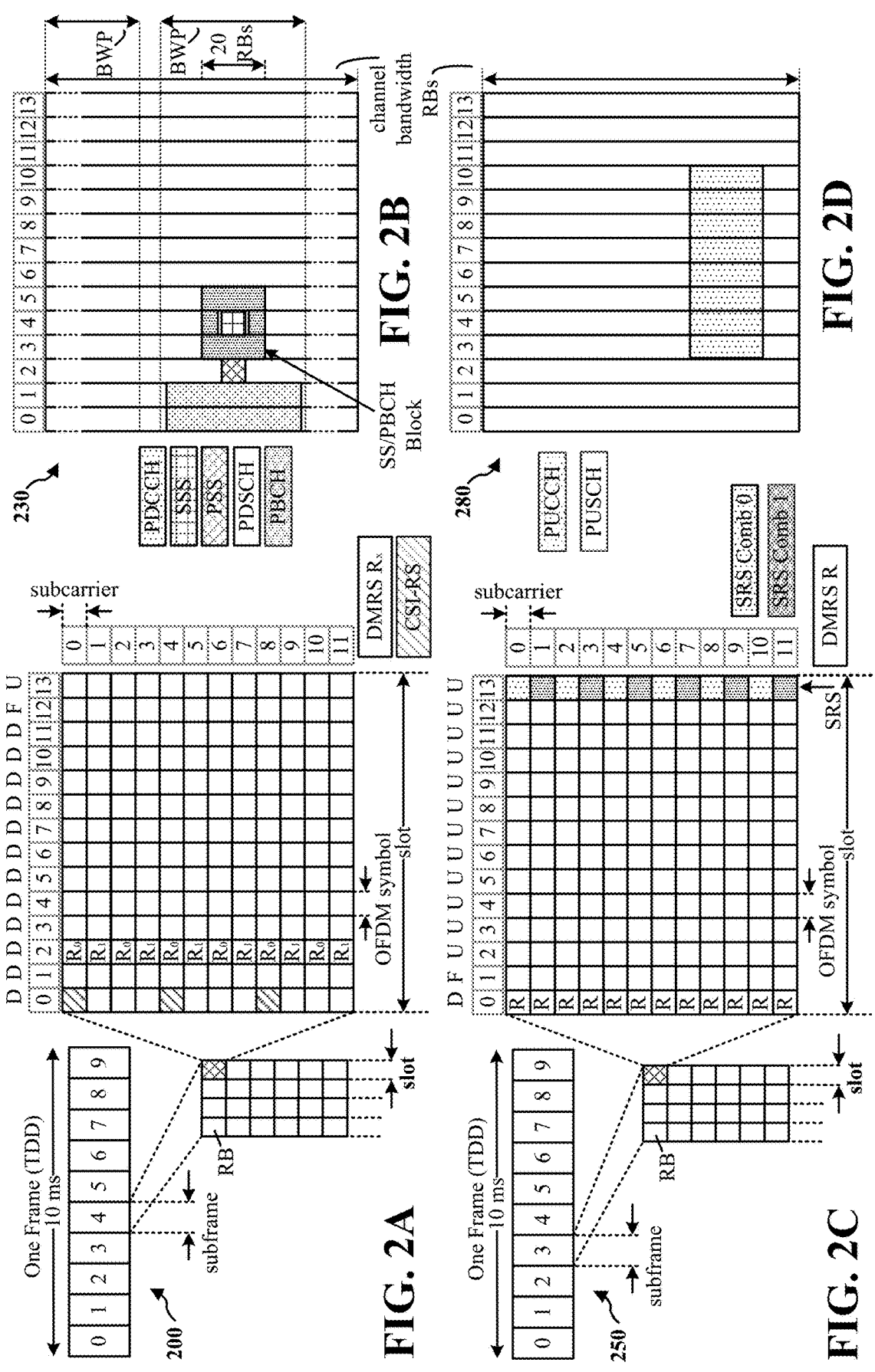
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynami-cally through DL control information (DCI), or semi-stati-cally/statically through radio resource control (RRC) signal-ing) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numer-ology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The sub-carrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configu-ration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits car-ried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
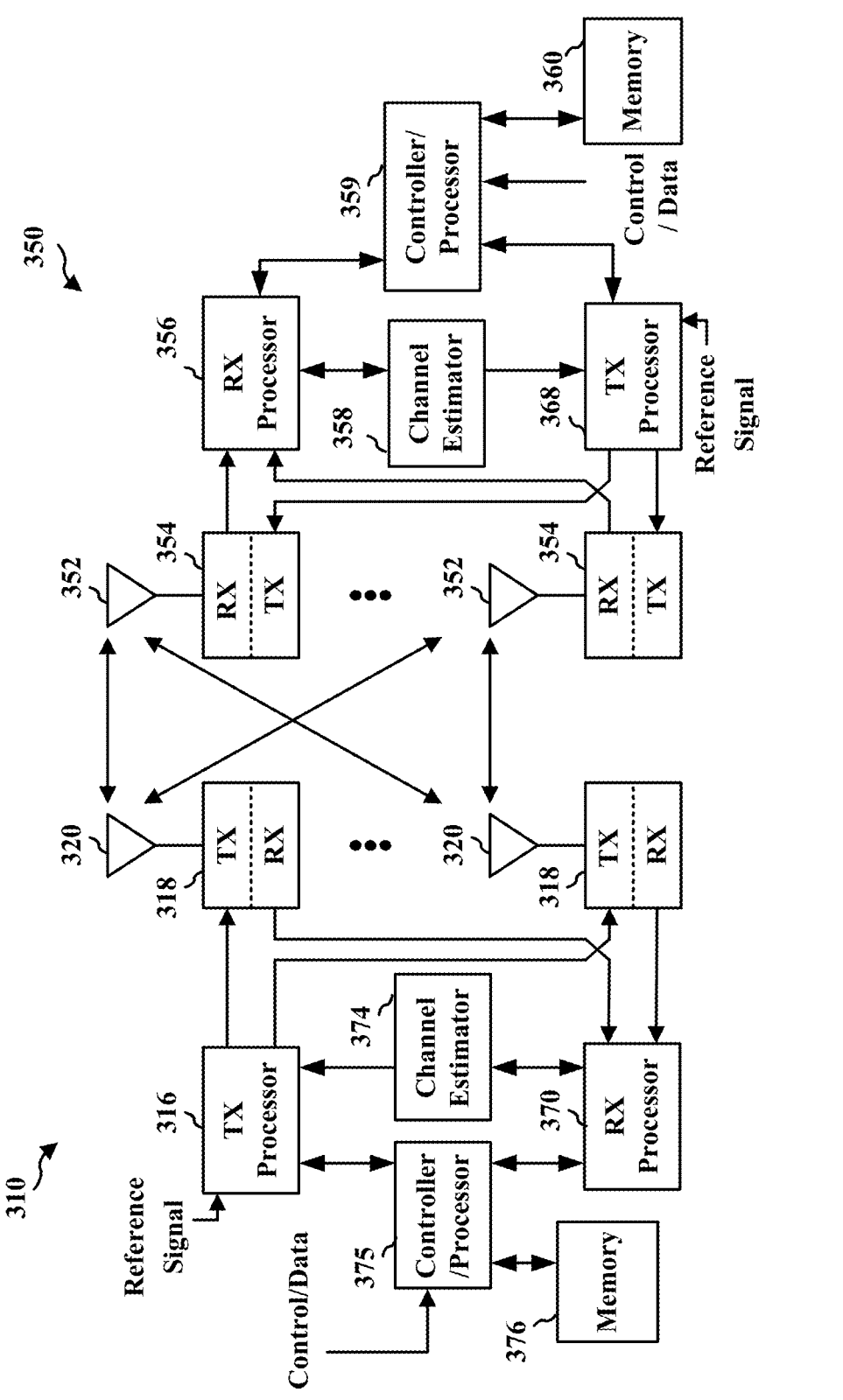
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

PDSCH DMRS bundling allows for DMRS symbols from different PDSCH occasions to be transmitted with phase coherence. A UE may coherently combine the bundled DMRS symbols due to the different PDSCH occasions being transmitted with phase coherence. The coherent processing assists in increasing the quality (e.g., signal to noise ratio or mean square error) of the received DMRS.

DMRS bundling may occur based on two modes, Mode 1 and Mode 2. Mode 1 includes a periodic bundling window and the bundle may comprise a configurable number of PDSCH occurrences. In addition, all of the PDSCH DMRS symbols in the periodic bundling window are bundled. Mode 2 includes a dynamic indication of a bundle boundary. The bundle, under Mode 2, may comprise a varying number of PDSCH occurrences, where the number of PDSCH occurrences may be dynamically controlled by PDCCH. A PDCCH may be configured to indicate where a new bundle begins or where a previous bundle ends, such that the bundle boundary may be configured dynamically.

UEs may easily support Mode 1 because UEs may not be required to dynamically handle the bundle boundary, since the bundle boundary is known and predetermined. UEs that support Mode 1 may be preconfigured with the same periodic processing pattern for each bundle of PDSCH DMRs.

Figure 4:
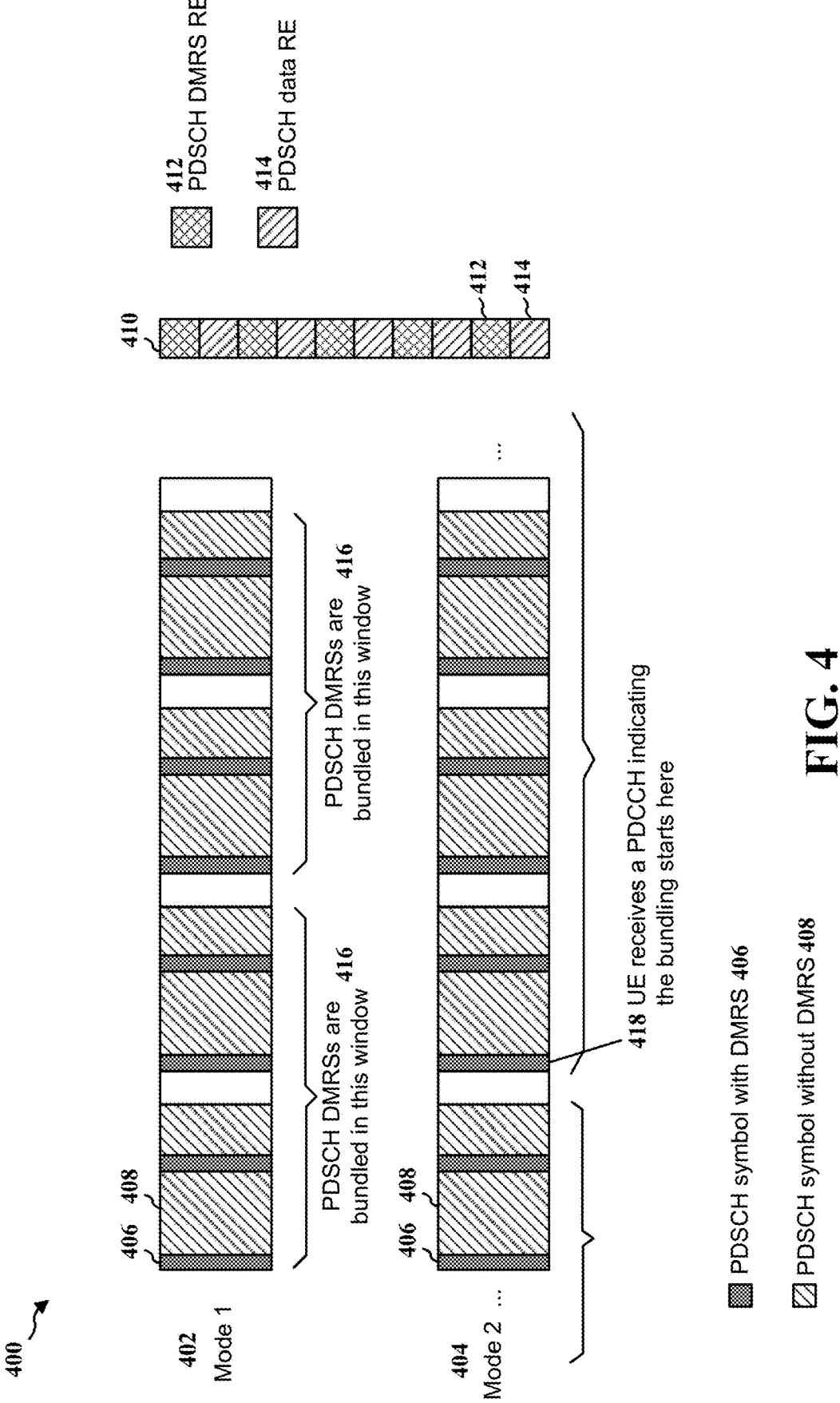
FIG. 4 is a diagram of modes of PDSCH DMRS bundling in accordance with certain aspects of the disclosure.

FIG. 4 illustrates a diagram 400 of the two modes of PDSCH DMRS bundling. The example of FIG. 4 shows a PDSCH mapping type B having a single symbol DMRS, and a DMRS type 1 with two symbols in each PDSCH slot. For example, Mode 1 402 includes a window 416 where the PDSCH DMRS are bundled. The bundle may include PDSCH symbol with DMRS 406 and PDSCH symbol without DMRS 408. The bundle in Mode 2 404 also includes PDSCH symbol with DMRS 406 and PDSCH symbol without DMRS 408. However, in Mode 2 404, the UE may receive a PDCCH 418 indicating where the bundling starts. The PDCCH 418 may also indicate where the previous bundle ends. The PDSCH symbol with DMRS 406, as shown in 410, may include PDSCH DMRS resource element (RE) 412 and PDSCH data RE 414. Both Mode 1 and Mode 2 may apply other PDSCH configurations, such as but not limited to PDSCH mapping type or PDSCH DMRS type. PDSCH mapping type may include Type A and Type B, where Type A includes a first DMRS symbol as the second or third symbol in the slot, where PDSCH data may start at symbol 0, and where Type B includes a first DMRS symbol in the first symbol of the PDSCH data regardless of where the first symbol of the PDSCH data is within a slot. PDSCH DMRS type may include Type 1 and Type 2, where Type 1 is configured with every other RE in a symbol is allocated to PDSCH DMRS of the same port, and where Type 2 is configured with two consecutive REs from every 6 consecutive REs in a symbol being allocated to PDSCH DMRS of the same port. Mode 1 and Mode 2 may be further configured to apply a single or double number of consecutive symbols with PDSCH DMRS. For example, a single number of consecutive symbols may allow for the maximum number of consecutive symbols with PDSCH DMRS to be 1, while a double number of consecutive symbols may allow for the maximum number of consecutive symbols with PDSCH DMRS to be 2. In addition, the number of symbols with PDSCH DMRS per slot may vary from 1, 2, 3, or 4.

In a PDSCH DMRS bundle, a UE may utilize infinite impulse response (IIR) filtering to process the DMRS symbols. The DMRS symbols may be processed as they are read into the UE, as opposed to processing all of the bundled DMRS in one shot, which may introduce processing delays. Also, at the beginning of bundles because the filter starts from an empty state, less processing gain is available due to the reduced number of PDSCH DMRS symbols involved in the filtering.

Figure 5:
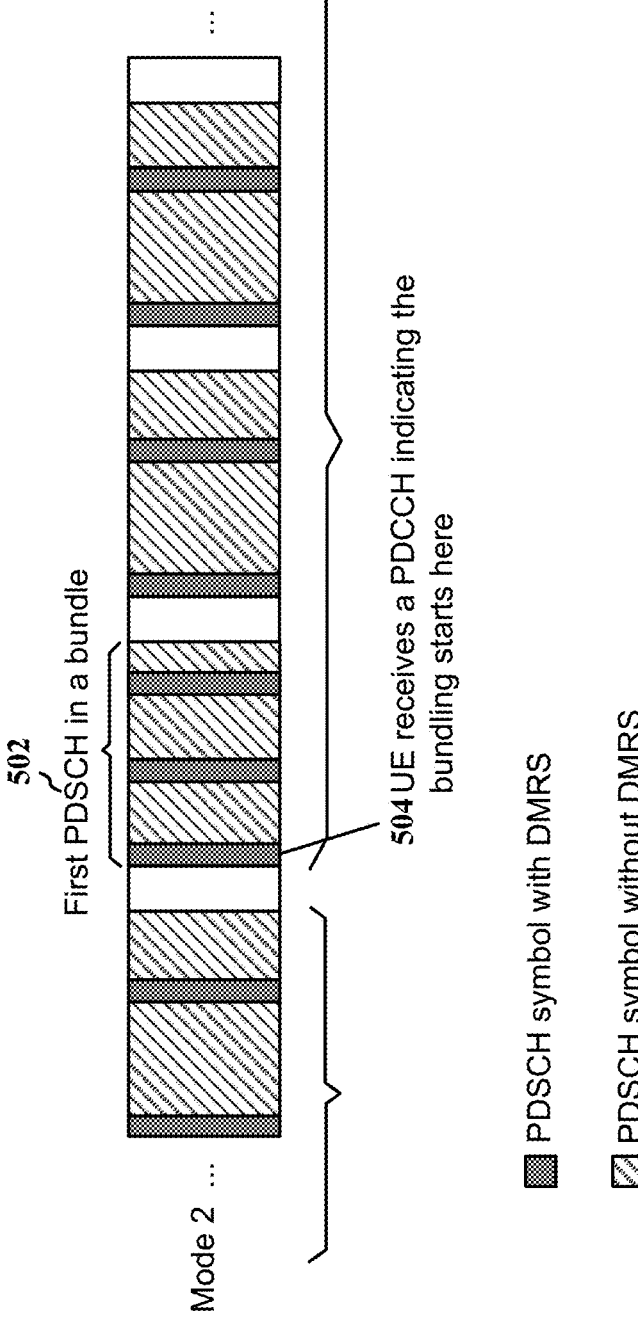
FIG. 5 is a diagram of a PDSCH DMRS bundling in accordance with certain aspects of the disclosure.

Aspects presented herein are directed to improving the manner in which PDSCH DMRS symbols are processed, which may result in enhancing processing gain at the beginning of a bundle. FIG. 5 illustrates a first example 500 of PDSCH DMRS bundling. The first example 500 of FIG. 5 includes PDSCH symbols with DMRS and PDSCH symbols without DMRS, as shown in FIG. 4. However, in the first example 500 of FIG. 5, for the same PDSCH bundle, the density of DMRS symbols in time is configured to be higher at the beginning of the bundle. The first example 500 of FIG. 5 utilizes Mode 2 to increase the number of DMRS symbols in a slot at the beginning of the bundle. For example, the first PDSCH 502 in a bundle may include three PDSCH symbols with DMRS in a slot, while the subsequent PDSCHs may have 2 PDSCH symbols with DMRS in a slot. In some aspects, the UE may receive a PDCCH 504 which indicates the starting point of a bundle.

To support slots having an increased or higher DMRS symbol density at the beginning of the bundle, the network (e.g., via a base station) may provide multiple PDSCH DMRS configurations to the UE. For example, one configuration may comprise a regular or lower DMRS density for slots that follow the first bundle. Other configurations may be configured to have an increased or higher DMRS density at the beginning of the bundle or that precede the end of the bundle. The configurations may be associated with a number of consecutive PDSCH occurrences or alternatively a number of consecutive slots with higher DMRS density at the beginning of the bundle. The UE may apply the configurations in the order that they were provided in a configuration message to the DMRS bundle. The remaining PDSCH occurrences or slots in the bundle may apply the configuration having the regular or lower DMRS density. In the first example 500, the network may provide two DMRS configuration to the UE, such that one configuration has a lower DMRS density for all the slots after the first slot of the bundle, and another configuration having a higher DMRS density at the beginning portion of the bundle in the first slot.

Figure 6:
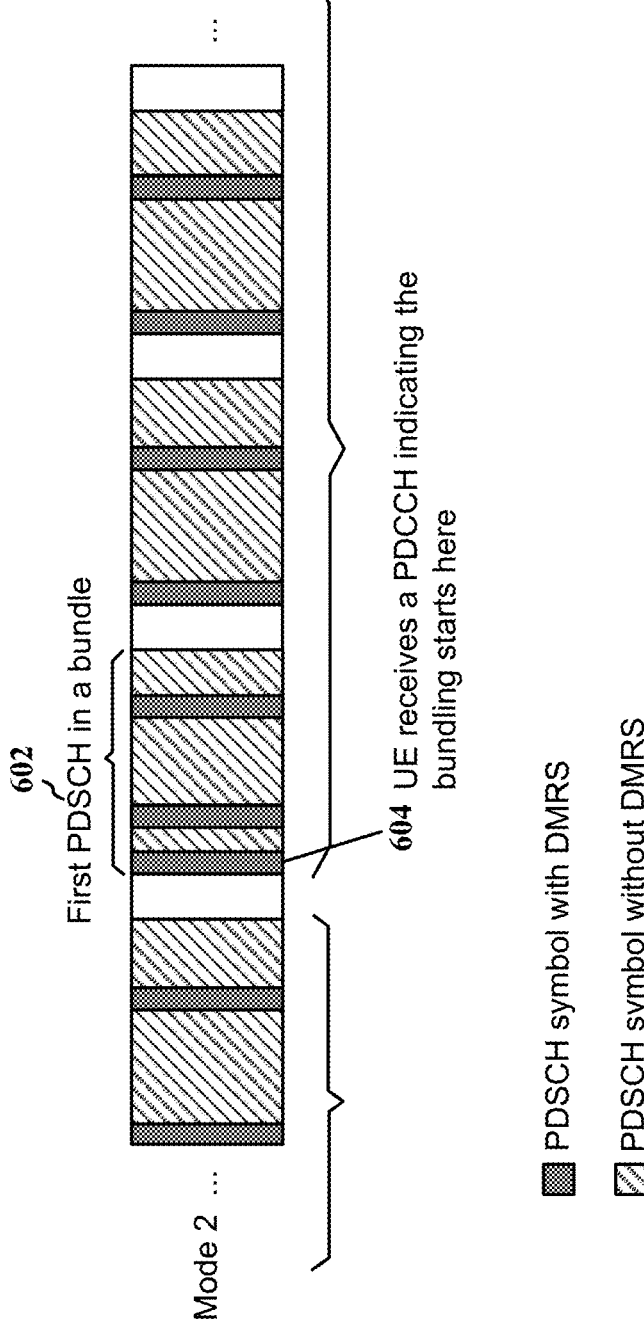
FIG. 6 is a diagram of a PDSCH DMRS bundling in accordance with certain aspects of the disclosure.

FIG. 6 illustrates a second example 600 of PDSCH DMRS bundling. The second example 600 of FIG. 6 includes PDSCH symbols with DMRS and PDSCH symbols without DMRS, as shown in FIGS. 4 and 5. However, in an effort to support the faster convergence of DMRS filtering at the beginning of a bundle, the example 600 of FIG. 6 may include a DMRS time domain pattern configured to allow for varying DMRS symbol density in a slot. Conventional designs tend to utilize a uniform distribution of DMRS occasions in a slot. The example 600 of FIG. 6 may include PDSCH DMRS symbol patterns in a slot which may have an increased or higher DMRS symbol density at the beginning of a slot while having a reduced or lower DMRS symbol density at the end of the slot.

As shown in FIG. 6, the bundle may include a first PDSCH 602 in the bundle with a non-uniform distribution of DMRS symbols. With reference to the example of FIG. 4 which has a uniform distribution of DMRS symbols, the non-uniform distribution of DMRS symbols of FIG. 6 may assist in improving DMRS filtering convergence at the beginning of a bundle. The varying DMRS symbol density may allow for more DMRS symbols to be at the beginning of the bundle which may increase the quality of the filtering of the DMRS which may also increase the quality of channel estimation.

The examples of FIGS. 5 and 6 utilize Mode 2 to increase the DMRS symbol density at the beginning of the slot/ bundle or to have the non-uniform distribution of the DMRS symbol density within the slot/bundle, which is distinct from Mode 1. A UE may be configured to indicate to the network which modes (e.g., Mode 1 or Mode 2) the UE may support. For example, the UE may be configured to transmit a report to the network that indicate the features supported by the UE. The UE may transmit a UE capability report which indicates the features supported by the UE. For example, the UE capability report may indicate whether the UE supports Mode 1 or Mode 2 PDSCH DMRS bundling, single or multiple DMRS configurations, or a DMRS time domain pattern that allows for varying DMRS symbol density. The UE may be configured to report the supported features independently or jointly based on different combinations of the features. For example, the UE may report that it supports Mode 1, multiple DMRS configurations, while not supporting a DMRS time domain pattern that allows for varying DMRS symbol density. In another example, the UE may jointly report the supported features based on different combinations of features, e.g., UE supports two combinations Mode 1, multiple DMRS configurations, and a DMRS time domain pattern that allows for varying DMRS symbol density, and Mode 2, single DMRS configuration, and does not support a DMRS time domain pattern that allows for varying DMRS symbol density. The UE may also be configured to report the supported features in capability signaling, which may be reported once, or in UE assistance information, which may be reported multiple times by the UE.

Figure 7:
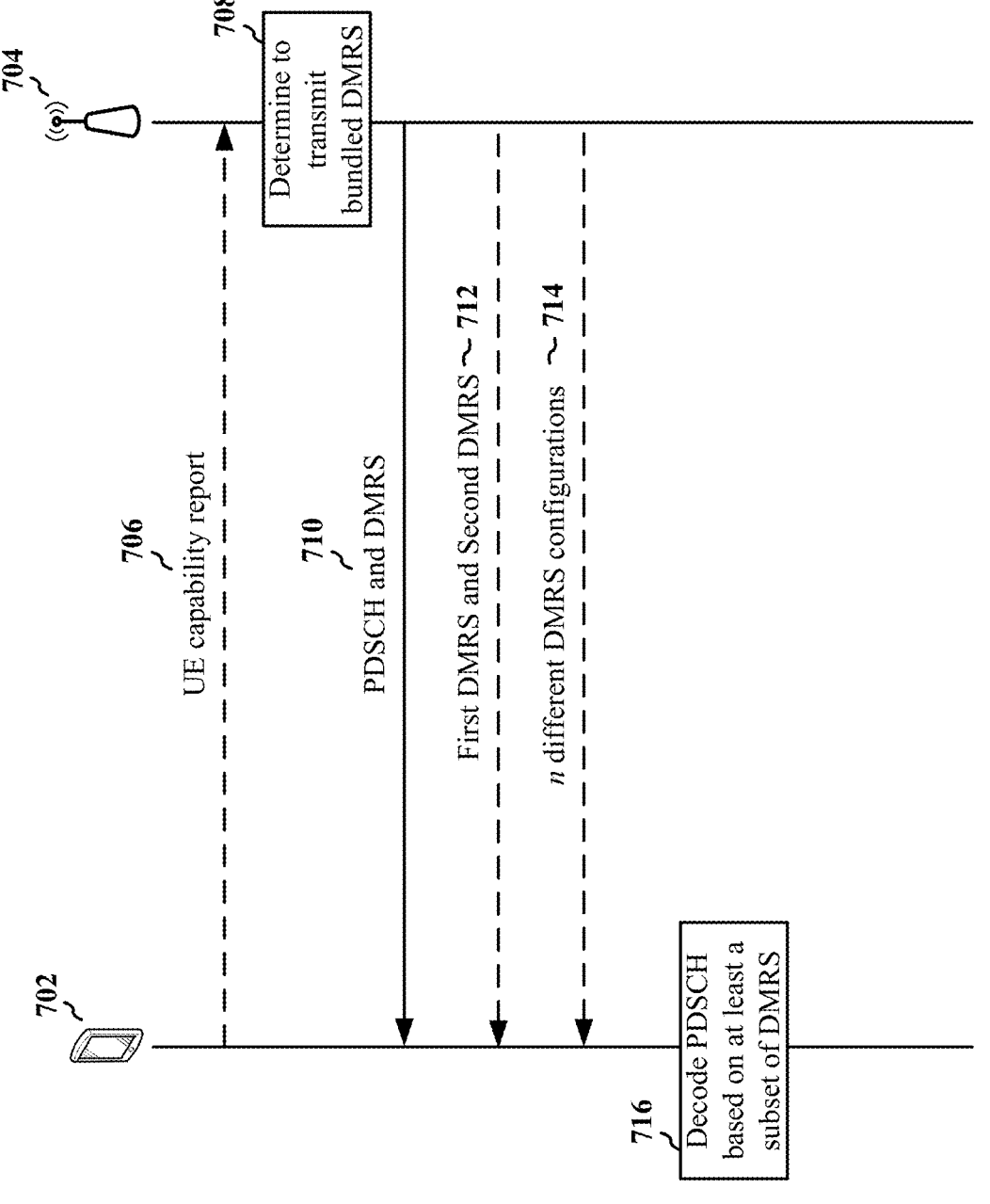
FIG. 7 is a call flow diagram of signaling between a UE and a base station in accordance with certain aspects of the disclosure.

FIG. 7 is a call flow diagram 700 of signaling between a UE 702 and a base station 704. The base station 704 may be configured to provide a cell. The UE 702 may be configured to communicate with the base station 704. For example, in the context of FIG. 1, the base station 704 may correspond to base station 102/180 and, accordingly, the cell may include a geographic coverage area 110 in which communication coverage is provided and/or small cell 102' having a coverage area 110'. Further, a UE 702 may correspond to at least UE 104. In another example, in the context of FIG. 3, the base station 704 may correspond to base station 310 and the UE 902 may correspond to UE 350. Optional aspects are illustrated with a dashed line.

In some aspects, as illustrated at 706, the UE 702 may transmit a UE capability report. The UE 702 may transmit the UE capability report to the base station 704. The base station 704 may receive the UE capability report from the UE 702. The UE capability report may include information indicating a UE capability for supporting at least one of a first mode of DMRS bundling or a second mode of DMRS bundling, a single DMRS configuration or multiple DMRS configurations, or specific types of DMRS time domain patterns. In some aspects, the first mode of DMRS bundling may correspond to DMRS being bundled in slots within a window. In some aspects, the second mode of DMRS bundling may correspond to DMRS being bundled in slots based on and following a received PDCCH indication. In some aspects, the UE capability report may be transmitted separately for each of the UE capabilities or jointly for the UE capabilities. In some aspects, the UE capability report may be transmitted within UE assistance information.

As illustrated at 708, the base station 704 may determine to transmit bundled DMRS in a plurality of slots. The base station may determine to transmit the bundled DMRS in the plurality of slots to a UE.

As illustrated at 710, the base station 704 may transmit a PDSCH and the DMRS in each slot of the plurality of slots. The UE 702 may receive the PDSCH and DMRS in each slot of the plurality of slots. The DMRS may be bundled across the plurality of slots. A first subset of slots of the plurality of slots may each have a higher DMRS symbol density of DMRS than a second subset of slots of the plurality of slots. The second subset of slots may be subsequent to the first subset of slots. In some aspects, the first subset of slots of the plurality of slots may each have a greater number of symbols carrying DMRS than a second subset of slots of the plurality of slots. In some aspects, the first subset of slots may include a first slot of the plurality of slots. The second subset of slots may include slots that may be subsequent to the first slot in the plurality of slots. In some aspects, for each slot of the first subset of slots, the DMRS symbol density may be higher for a first portion of the slot than for a second portion of the slot. In such aspects, the second portion may be subsequent to the first portion. In some aspects, each slot of the first subset of slots may include two symbols of DMRS, such that a second symbol of the DMRS is located at or before a $9^{th}$ symbol after the first symbol of DMRS. In some aspects, each slot of the first subset of slots may include three symbols of DMRS, such that a third symbol of the DMRS is located at or before a $9^{th}$ symbol after the first symbol of DMRS. In some aspects, each slot of the first subset of slots may include four symbols of DMRS, such that a fourth symbol of the DMRS is located at or before a $9^{th}$ symbol after the first symbol of DMRS. In some aspects, the bundled DMRS may be transmitted to the UE with a same phase coherence. In some aspects, the bundled DMRS may be associated with a same phase coherence of the transmitted DMRS from the base station.

In some aspects, as illustrated at 712, the base station 704 may transmit a first DMRS configuration and a second DMRS configuration. The UE 702 may receive the first DMRS configuration and the second DMRS configuration. The second DMRS configuration may be different than the first DMRS configuration. The first DMRS configuration may indicate a higher DMRS symbol density than the second DMRS configuration. The DMRS in the first subset of slots may be transmitted based on the first DMRS configuration. The DMRS in the second subset of slots may be transmitted based on the second DMRS configuration. The UE 702 may receive the DMRS in the second subset of slots based on the second DMRS configuration.

In some aspects, as illustrated at 714, the base station 704 may transmit n different DMRS configurations associated with the n subsets of slots in instances where the plurality of slots includes n subsets of slots, where n≥3. The UE 702 may receive the n different DMRS configurations associated with the n subsets of slots. In such aspects, the first DMRS configuration of the n DMRS configurations may indicate a higher DMRS symbol density than other DMRS configurations of the n DMRS configurations. In some aspects, the DMRS in the n subsets of slots may be transmitted based on the received n DMRS configurations. The UE 702 may receive the DMRS in the n subsets of slots based on the received n DMRS configurations.

As illustrated at 716, the UE 702 may decode each of the received PDSCH. The UE may decode each received PDSCH based on at least a subset of the received DMRS.

FIG. 8 is a flowchart 800 of a method of wireless communication. The method may be performed by a UE or a component of a UE (e.g., the UE 104, 350, 702; the apparatus 902; the cellular baseband processor 904, which may include the memory 360 and which may be the entire UE 350 or a component of the UE 350, such as the TX processor 368, the RX processor 356, and/or the controller processor 359). One or more of the illustrated operations may be omitted, transposed, or contemporaneous. Optional aspects are illustrated with a dashed line. The method may allow a UE to process a PDSCH DMRS bundle having a higher density of DMRS symbols at a beginning of the PDSCH DMRS bundle.

In some aspects, for example at 802, the UE may transmit a UE capability report. For example, 802 may be performed by capability component 940 of apparatus 902. The UE may transmit the UE capability report to a base station. The UE capability report may include information indicating a UE capability for supporting at least one of a first mode of DMRS bundling or a second mode of DMRS bundling, a single DMRS configuration or multiple DMRS configurations, or specific types of DMRS time domain patterns. In some aspects, the first mode of DMRS bundling may correspond to DMRS being bundled in slots within a window. In some aspects, the second mode of DMRS bundling may correspond to DMRS being bundled in slots based on and following a received PDCCH indication. In some aspects, the UE capability report may be transmitted separately for each of the UE capabilities or jointly for the UE capabilities. In some aspects, the UE capability report may be transmitted within UE assistance information.

At 804, the UE may receive a PDSCH and DMRS in each slot of a plurality of slots. For example, 804 may be performed by reception component 930 of apparatus 902. The DMRS may be bundled across the plurality of slots. A first subset of slots of the plurality of slots may each have a higher DMRS symbol density of DMRS than a second subset of slots of the plurality of slots. The second subset of slots may be subsequent to the first subset of slots. In some aspects, the first subset of slots of the plurality of slots may each have a greater number of symbols carrying DMRS than a second subset of slots of the plurality of slots. In some aspects, the first subset of slots may include a first slot of the plurality of slots. The second subset of slots may include slots that may be subsequent to the first slot in the plurality of slots. In some aspects, for each slot of the first subset of slots, the DMRS symbol density may be higher for a first portion of the slot than for a second portion of the slot. In such aspects, the second portion may be subsequent to the first portion. In some aspects, each slot of the first subset of slots may include two symbols of DMRS, such that a second symbol of the DMRS is located at or before a $9^{th}$ symbol after the first symbol of DMRS. In some aspects, each slot of the first subset of slots may include three symbols of DMRS, such that a third symbol of the DMRS is located at or before a $9^{th}$ symbol after the first symbol of DMRS. In some aspects, each slot of the first subset of slots may include four symbols of DMRS, such that a fourth symbol of the DMRS is located at or before a $9^{th}$ symbol after the first symbol of DMRS. In some aspects, the bundled DMRS may be associated with a same phase coherence of the transmitted DMRS from the base station.

In some aspects, for example at 806, the UE may receive a first DMRS configuration and a second DMRS configuration. For example, 806 may be performed by configuration component 942 of apparatus 902. The second DMRS configuration may be different than the first DMRS configuration. The first DMRS configuration may indicate a higher DMRS symbol density than the second DMRS configuration. The DMRS in the first subset of slots may be received based on the first DMRS configuration. The DMRS in the second subset of slots may be received based on the second DMRS configuration.

In some aspects, for example at 808, the plurality of slots may include n subsets of slots, where n≥3, such that the UE may receive n different DMRS configurations associated with the n subsets of slots. For example, 808 may be performed by configuration component 942 of apparatus 902. The first DMRS configuration of the n DMRS configurations may indicate a higher DMRS symbol density than other DMRS configurations of the n DMRS configurations. In some aspects, the DMRS in the n subsets of slots may be received based on the received n DMRS configurations.

At 810, the UE may decode each of the received PDSCH. For example, 810 may be performed by decode component 944 of apparatus 902. The UE may decode each received PDSCH based on at least a subset of the received DMRS.

Figure 9:
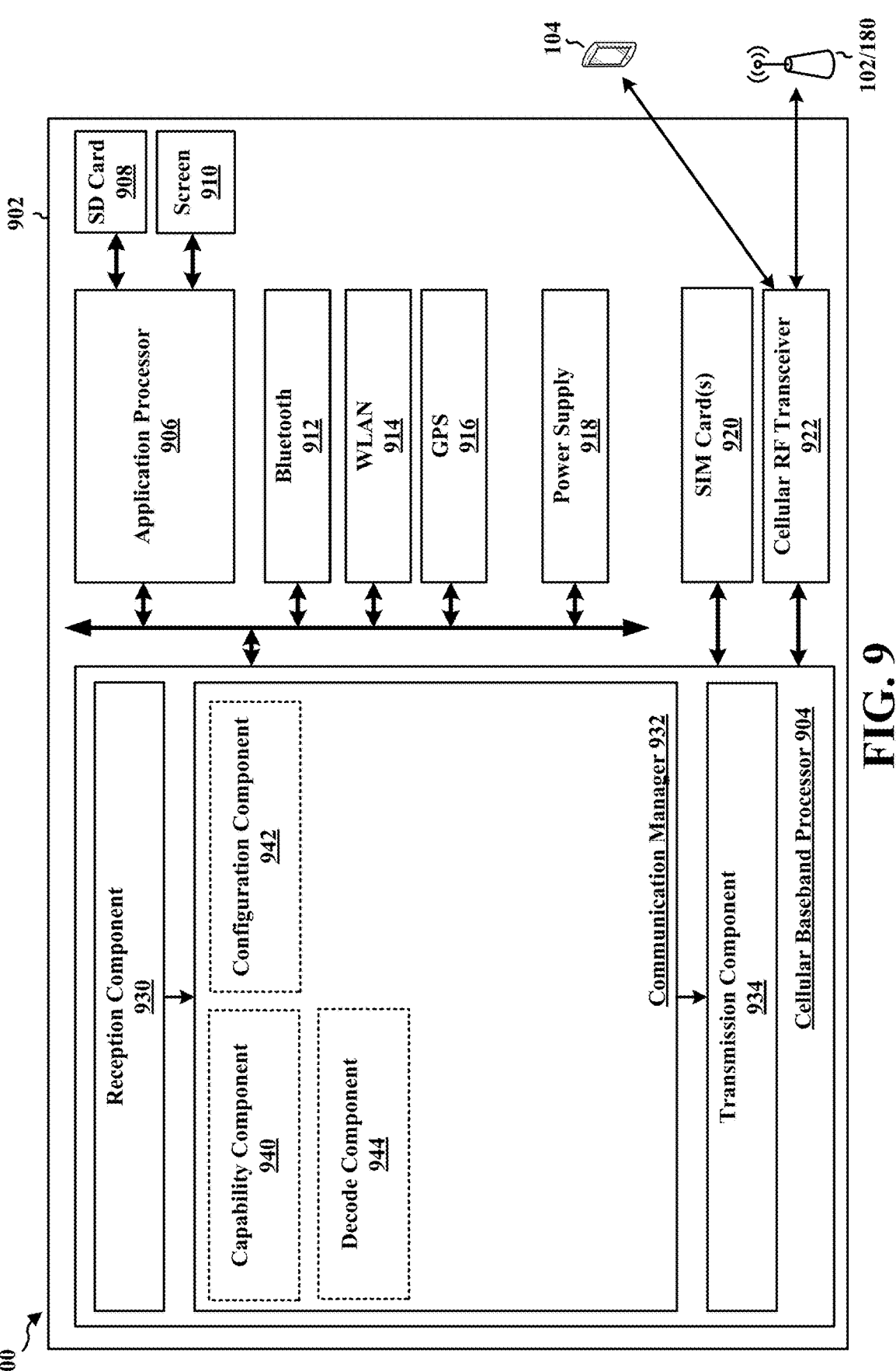
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a capability component 940 that is configured to transmit a UE capability report, e.g., as described in connection with 802 of FIG. 8. The communication manager 932 further includes a configuration component 942 that is configured to receive a first DMRS configuration and a second DMRS configuration, e.g., as described in connection with 806 of FIG. 8. The configuration component 942 may be configured to receive n different DMRS configurations associated with the n subsets of slots, e.g., as described in connection with 808 of FIG. 8. The communication manager 932 further includes a decode component 944 that is configured to decode each of the received PDSCH, e.g., as described in connection with 810 of FIG. 8. The reception component 930 may be configured to receive a PDSCH and DMRS in each slot of a plurality of slots, e.g., as described in connection with 804 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving a PDSCH and DMRS in each slot of a plurality of slots. The DMRS being bundled across the plurality of slots. A first subset of slots of the plurality of slots each having a higher DMRS symbol density of DMRS than a second subset of slots of the plurality of slots. The second subset of slots being subsequent to the first subset of slots. The apparatus includes means for decoding each received PDSCH based on at least a subset of the received DMRS. The apparatus further includes means for receiving a first DMRS configuration and a second DMRS configuration different than the first DMRS configuration. The first DMRS configuration indicating a higher DMRS symbol density than the second DMRS configuration. The DMRS in the first subset of slots are received based on the first DMRS configuration, and the DMRS in the second subset of slots are received based on the second DMRS configuration. The apparatus further includes means for receiving n different DMRS configurations associated with the n subsets of slots. A first DMRS configuration of the n DMRS configurations indicating a higher DMRS symbol density than other DMRS configurations of the n DMRS configurations. The DMRS in the n subsets of slots are received based on the received n DMRS configurations. The apparatus further includes means for transmitting, to a base station, a UE capability report including information indicating a UE capability for supporting at least one of a first mode of DMRS bundling or a second mode of DMRS bundling, a single DMRS configuration or multiple DMRS configurations, or specific types of DMRS time domain patterns. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
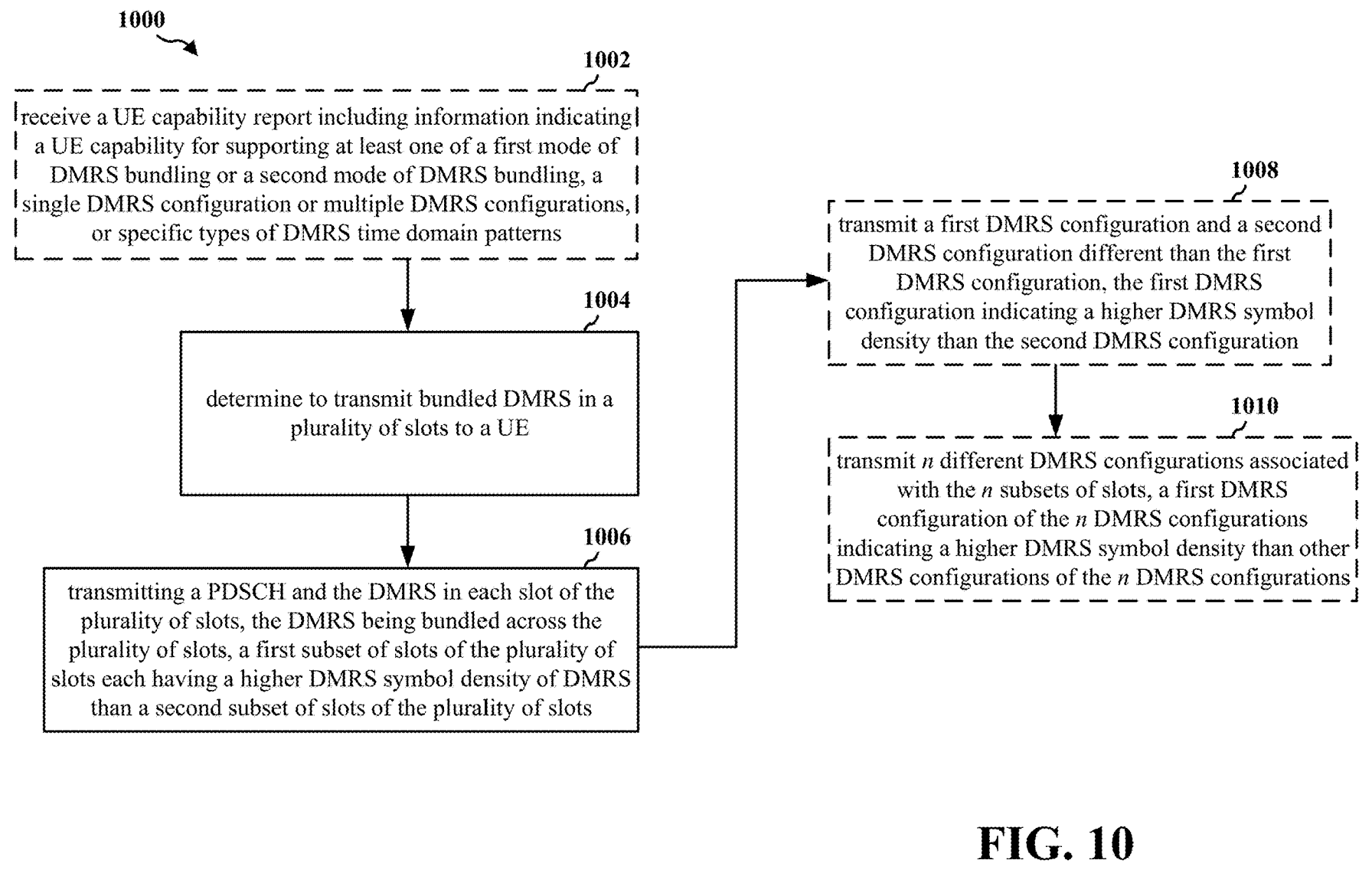

FIG. 10 is a flowchart 1000 of a method of wireless communication. The method may be performed by a base station or a component of a base station (e.g., the base station 102/180, 704; the apparatus 1102; the baseband unit 1104, which may include the memory 376 and which may be the entire base station 310 or a component of the base station

310, such as the TX processor 316, the RX processor 370, and/or the controller/processor 375). One or more of the illustrated operations may be omitted, transposed, or contemporaneous. Optional aspects are illustrated with a dashed line. The method may allow a base station to provide a UE with a PDSCH DMRS bundle having a higher density of DMRS symbols at a beginning of the PDSCH DMRS bundle.

In some aspects, for example at 1002, the base station may receive a UE capability report. For example, 1002 may be performed by capability component 1140 of apparatus 1102. The base station may receive the UE capability report from a UE. The UE capability report may include information indicating a UE capability for supporting at least one of a first mode of DMRS bundling or a second mode of DMRS bundling, a single DMRS configuration or multiple DMRS configurations, or specific types of DMRS time domain patterns. The transmission of the DMRS to the UE may be based on the received UE capability report. In some aspects, the first mode of DMRS bundling may correspond to DMRS being bundled in slots within a window. In some aspects, the second mode of DMRS bundling may correspond to DMRS being bundled in slots based on and following a received PDCCH indication. In some aspects, the UE capability report may be received separately for each of the UE capabilities or jointly for the UE capabilities. In some aspects, the UE capability report may be received within UE assistance information.

At 1004, the base station may determine to transmit bundled DMRS in a plurality of slots. For example, 1004 may be performed by DMRS component 1142 of apparatus 1102. The base station may determine to transmit the bundled DMRS in the plurality of slots to a UE.

At 1006, the base station may transmit a PDSCH and the DMRS in each slot of the plurality of slots. For example, 1006 may be performed by transmission component 1134 of apparatus 1102. The DMRS may be bundled across the plurality of slots. A first subset of slots of the plurality of slots may each have a higher DMRS symbol density of DMRS than a second subset of slots of the plurality of slots. The second subset of slots may be subsequent to the first subset of slots. In some aspects, the first subset of slots of the plurality of slots may each have a greater number of symbols carrying DMRS than a second subset of slots of the plurality of slots. In some aspects, the first subset of slots may include a first slot of the plurality of slots. The second subset of slots may include slots that may be subsequent to the first slot in the plurality of slots. In some aspects, for each slot of the first subset of slots, the DMRS symbol density may be higher for a first portion of the slot than for a second portion of the slot. In such aspects, the second portion may be subsequent to the first portion. In some aspects, each slot of the first subset of slots may include two symbols of DMRS, such that a second symbol of the DMRS is located at or before a $9^{th}$ symbol after the first symbol of DMRS. In some aspects, each slot of the first subset of slots may include three symbols of DMRS, such that a third symbol of the DMRS is located at or before a $9^{th}$ symbol after the first symbol of DMRS. In some aspects, each slot of the first subset of slots may include four symbols of DMRS, such that a fourth symbol of the DMRS is located at or before a $9^{th}$ symbol after the first symbol of DMRS. In some aspects, the bundled DMRS may be transmitted to the UE with a same phase coherence.

In some aspects, for example at 1008, the base station may transmit a first DMRS configuration and a second DMRS configuration. For example, 1008 may be performed by configuration component 1144 of apparatus 1102. The second DMRS configuration may be different than the first DMRS configuration. The first DMRS configuration may indicate a higher DMRS symbol density than the second DMRS configuration. The DMRS in the first subset of slots may be transmitted based on the first DMRS configuration. The DMRS in the second subset of slots may be transmitted based on the second DMRS configuration.

In some aspects, for example at 1010, the plurality of slots may include n subsets of slots, where n≥3, such that the base station may transmit n different DMRS configurations associated with the n subsets of slots. For example, 1010 may be performed by configuration component 1144 of apparatus 1102. The first DMRS configuration of the n DMRS configurations may indicate a higher DMRS symbol density than other DMRS configurations of the n DMRS configurations. In some aspects, the DMRS in the n subsets of slots may be transmitted based on the received n DMRS configurations.

Figure 11:
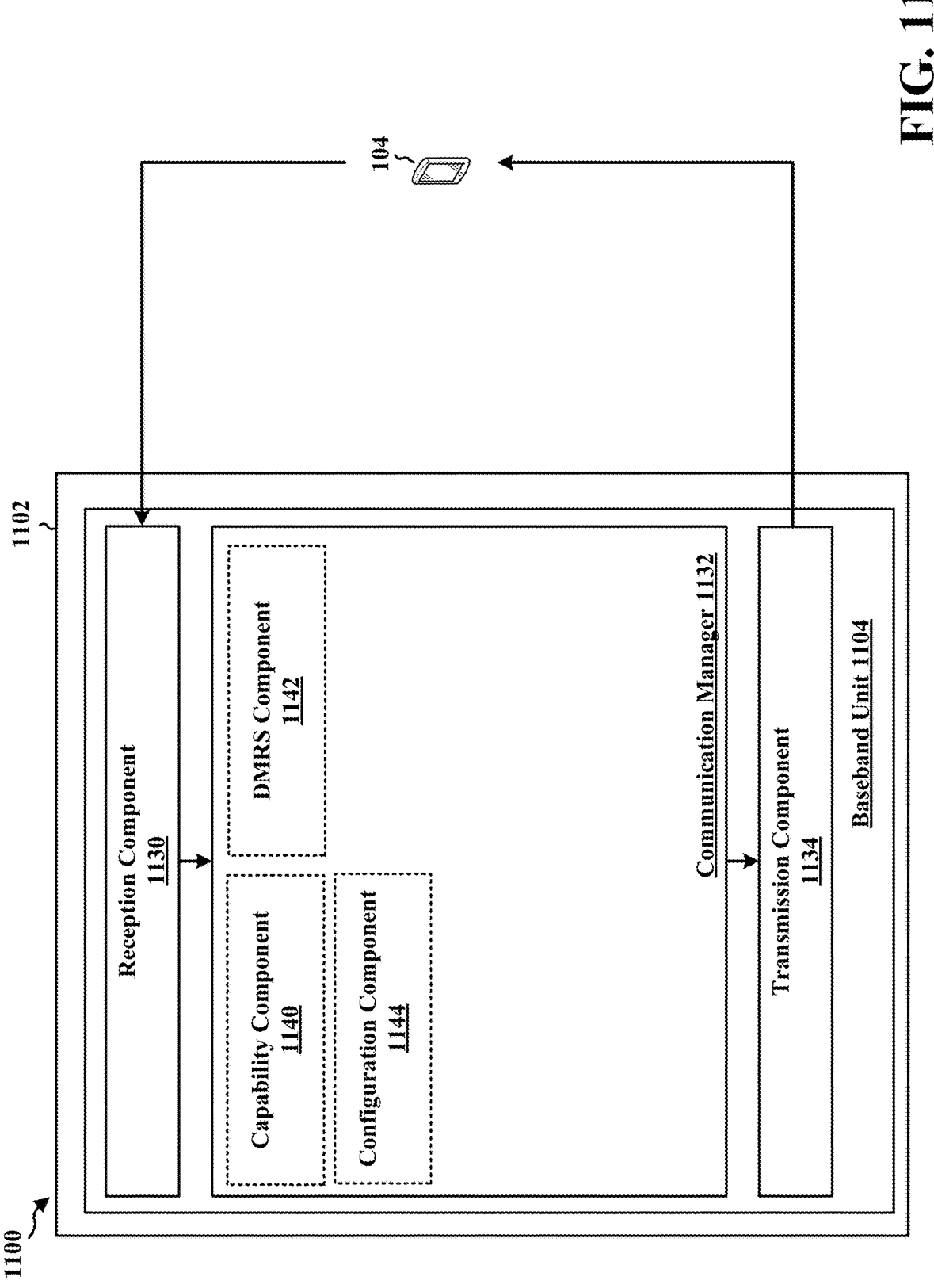
FIG. 11 is a diagram illustrating an example of a hardware implementation for an example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a capability component 1140 that may receive a UE capability report, e.g., as described in connection with 1002 of FIG. 10. The communication manager 1132 further includes a DMRS component 1142 that may determine to transmit bundled DMRS in a plurality of slots, e.g., as described in connection with 1004 of FIG. 10. The communication manager 1132 further includes a configuration component 1144 that may transmit a first DMRS configuration and a second DMRS configuration, e.g., as described in connection with 1008 of FIG. 10. The configuration component 1144 may transmit n different DMRS configurations associated with the n subsets of slots, e.g., as described in connection with 1010 of FIG. 10. The transmission component 1134 may transmit a PDSCH and the DMRS in each slot of the plurality of slots, e.g., as described in connection with 1006 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for determining to transmit bundled DMRS in a plurality of slots to a UE. The apparatus includes means for transmitting a PDSCH and the DMRS in each slot of the plurality of slots. The DMRS being bundled across the plurality of slots. A first subset of slots of the plurality of slots each having a higher DMRS symbol density of DMRS than a second subset of slots of the plurality of slots. The second subset of slots being subsequent to the first subset of slots. The apparatus further includes means for transmitting a first DMRS configuration and a second DMRS configuration different than the first DMRS configuration. The first DMRS configuration indicating a higher DMRS symbol density than the second DMRS configuration. The DMRS in the first subset of slots are transmitted based on the first DMRS configuration, and the DMRS in the second subset of slots are transmitted based on the second DMRS configuration. The apparatus further includes means for transmitting n different DMRS configurations associated with the n subsets of slots. A first DMRS configuration of the n DMRS configurations indicating a higher DMRS symbol density than other DMRS configurations of the n DMRS configurations. The DMRS in the n subsets of slots are transmitted based on the received n DMRS configurations. The apparatus further includes means for receiving, from the UE, a UE capability report including information indicating a UE capability for supporting at least one of a first mode of DMRS bundling or a second mode of DMRS bundling, a single DMRS configuration or multiple DMRS configurations, or specific types of DMRS time domain patterns. The transmission of the DMRS to the UE is based on the received UE capability report. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication of a UE comprising receiving a PDSCH and DMRS in each slot of a plurality of slots, the DMRS being bundled across the plurality of slots, a first subset of slots of the plurality of slots each having a higher DMRS symbol density of DMRS than a second subset of slots of the plurality of slots, the second subset of slots being subsequent to the first subset of slots; and decoding each received PDSCH based on at least a subset of the received DMRS.

In Example 2, the method of Example 1 further includes that the first subset of slots of the plurality of slots each have a greater number of symbols carrying DMRS than a second subset of slots of the plurality of slots.

In Example 3, the method of Example 1 or 2 further includes that the first subset of slots includes a first slot of the plurality of slots.

In Example 4, the method of any of Examples 1-3 further includes that the second subset of slots includes slots subsequent to the first slot in the plurality of slots.

In Example 5, the method of any of Examples 1-4 further includes receiving a first DMRS configuration and a second DMRS configuration different than the first DMRS configuration, the first DMRS configuration indicating a higher DMRS symbol density than the second DMRS configuration, wherein the DMRS in the first subset of slots are received based on the first DMRS configuration, and the DMRS in the second subset of slots are received based on the second DMRS configuration.

In Example 6, the method of any of Examples 1-5 further includes that the plurality of slots includes n subsets of slots, where n≥3, further including receiving n different DMRS configurations associated with the n subsets of slots, a first DMRS configuration of the n DMRS configurations indicating a higher DMRS symbol density than other DMRS configurations of the n DMRS configurations, wherein the DMRS in the n subsets of slots are received based on the received n DMRS configurations.

In Example 7, the method of any of Examples 1-6 further includes that for each slot of the first subset of slots, the DMRS symbol density is higher for a first portion of the slot than for a second portion of the slot, the second portion being subsequent to the first portion.

In Example 8, the method of any of Examples 1-7 further includes that each slot of the first subset of slots includes two symbols of DMRS, where a second symbol of the DMRS is located at or before a $9^{th}$ symbol after the first symbol of DMRS.

In Example 9, the method of any of Examples 1-8 further includes that each slot of the first subset of slots includes three symbols of DMRS, where a third symbol of the DMRS is located at or before a $9^{th}$ symbol after the first symbol of DMRS.

In Example 10, the method of any of Examples 1-9 further includes that each slot of the first subset of slots includes four symbols of DMRS, where a fourth symbol of the DMRS is located at or before a $9^{th}$ symbol after the first symbol of DMRS.

In Example 11, the method of any of Examples 1-10 further includes transmitting, to a base station, a UE capability report including information indicating a UE capability for supporting at least one of a first mode of DMRS bundling or a second mode of DMRS bundling, a single DMRS configuration or multiple DMRS configurations, or specific types of DMRS time domain patterns.

In Example 12, the method of any of Examples 1-11 further includes that the first mode of DMRS bundling corresponds to DMRS being bundled in slots within a window, and the second mode of DMRS bundling corresponds to DMRS being bundled in slots based on and following a received PDCCH indication.

In Example 13, the method of any of Examples 1-12 further includes that the UE capability report is transmitted separately for each of the UE capabilities or jointly for the UE capabilities.

In Example 14, the method of any of Examples 1-13 further includes that the UE capability report is transmitted within UE assistance information.

In Example 15, the method of any of Examples 1-14 further includes that the bundled DMRS are associated with a same phase coherence of transmitted DMRS from a base station.

Example 16 is a device including one or more processors and one or more memories in electronic communication with the one or more processors storing instructions executable by the one or more processors to cause the system or apparatus to implement a method as in any of Examples 1-15.

Example 17 is a system or apparatus including means for implementing a method or realizing an apparatus as in any of Examples 1-15.

Example 18 is a non-transitory computer readable medium storing instructions executable by one or more processors to cause the one or more processors to implement a method as in any of Examples 1-15.

Example 19 is a method of wireless communication of a base station comprising determining to transmit bundled DMRS in a plurality of slots to a UE; and transmitting a PDSCH and the DMRS in each slot of the plurality of slots, the DMRS being bundled across the plurality of slots, a first subset of slots of the plurality of slots each having a higher DMRS symbol density of DMRS than a second subset of slots of the plurality of slots, the second subset of slots being subsequent to the first subset of slots.

In Example 20, the method of Example 19 further includes that the first subset of slots of the plurality of slots each have a greater number of symbols carrying DMRS than a second subset of slots of the plurality of slots.

In Example 21, the method of Example 19 or 20 further includes that the first subset of slots includes a first slot of the plurality of slots.

In Example 22, the method of any of Examples 19-21 further includes that the second subset of slots includes slots subsequent to the first slot in the plurality of slots.

In Example 23, the method of any of Examples 19-22 further includes transmitting a first DMRS configuration and a second DMRS configuration different than the first DMRS configuration, the first DMRS configuration indicating a higher DMRS symbol density than the second DMRS configuration, wherein the DMRS in the first subset of slots are transmitted based on the first DMRS configuration, and the DMRS in the second subset of slots are transmitted based on the second DMRS configuration.

In Example 24, the method of any of Examples 19-23 further includes that the plurality of slots includes n subsets of slots, where n≥3, further including transmitting n different DMRS configurations associated with the n subsets of slots, a first DMRS configuration of the n DMRS configurations indicating a higher DMRS symbol density than other DMRS configurations of the n DMRS configurations, wherein the DMRS in the n subsets of slots are transmitted based on the received n DMRS configurations.

In Example 25, the method of any of Examples 19-24 further includes that for each slot of the first subset of slots, the DMRS symbol density is higher for a first portion of the slot than for a second portion of the slot, the second portion being subsequent to the first portion.

In Example 26, the method of any of Example 19-25 further includes that each slot of the first subset of slots includes two symbols of DMRS, where a second symbol of the DMRS is located at or before a $9^{th}$ symbol after the first symbol of DMRS.

In Example 27, the method of any of Examples 19-26 further includes that each slot of the first subset of slots includes three symbols of DMRS, where a third symbol of the DMRS is located at or before a $9^{th}$ symbol after the first symbol of DMRS.

In Example 28, the method of any of Examples 19-27 further includes that each slot of the first subset of slots includes four symbols of DMRS, where a fourth symbol of the DMRS is located at or before a $9^{th}$ symbol after the first symbol of DMRS.

In Example 29, the method of any of Examples 19-28 further includes receiving, from the UE, a UE capability report including information indicating a UE capability for supporting at least one of a first mode of DMRS bundling or a second mode of DMRS bundling, a single DMRS configuration or multiple DMRS configurations, or specific types of DMRS time domain patterns, wherein the transmission of the DMRS to the UE is based on the received UE capability report.

In Example 30, the method of any of Examples 19-29 further includes that the first mode of DMRS bundling corresponds to DMRS being bundled in slots within a window, and the second mode of DMRS bundling corresponds to DMRS being bundled in slots based on and following a transmitted PDCCH indication.

In Example 31, the method of any of Examples 19-30 further includes that the UE capability report is received separately for each of the UE capabilities or jointly for the UE capabilities.

In Example 32, the method of any of Examples 19-31 further includes that the UE capability report is received within UE assistance information.

In Example 33, the method of any of Examples 19-32 further includes that the bundled DMRS are transmitted to the UE with a same phase coherence.

Example 34 is a device including one or more processors and one or more memories in electronic communication with the one or more processors storing instructions executable by the one or more processors to cause the system or apparatus to implement a method as in any of Examples 19-33.

Example 35 is a system or apparatus including means for implementing a method or realizing an apparatus as in any of Examples 19-33.

Example 36 is a non-transitory computer readable medium storing instructions executable by one or more processors to cause the one or more processors to implement a method as in any of Examples 19-33.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    receiving a physical downlink shared channel (PDSCH) and demodulation reference signals (DMRS) in each slot of a plurality of slots, the DMRS being bundled across the plurality of slots, a first subset of slots of the plurality of slots each having a higher DMRS symbol density of DMRS in a time-domain than a second subset of slots of the plurality of slots, the second subset of slots being subsequent to the first subset of slots, wherein the first subset of slots of the plurality of slots is phase-coherent with the second subset of slots of the plurality of slots; and
    decoding each received PDSCH based on at least a subset of the received DMRS.

2. The method of claim 1, wherein the first subset of slots of the plurality of slots each have a greater number of symbols carrying DMRS than a second subset of slots of the plurality of slots.

3. The method of claim 1, wherein the first subset of slots includes a first slot of the plurality of slots.

4. The method of claim 3, wherein the second subset of slots includes slots subsequent to the first slot in the plurality of slots.

5. The method of claim 1, further comprising:
    receiving a first DMRS configuration and a second DMRS configuration different than the first DMRS configuration, the first DMRS configuration indicating a higher DMRS symbol density than the second DMRS configuration, wherein the DMRS in the first subset of slots are received based on the first DMRS configuration, and the DMRS in the second subset of slots are received based on the second DMRS configuration.

6. The method of claim 1, wherein the plurality of slots includes n subsets of slots, where n≥3, the method further comprising:
    receiving n different DMRS configurations associated with the n subsets of slots, a first DMRS configuration of the n DMRS configurations indicating a higher DMRS symbol density than other DMRS configurations of the n DMRS configurations, wherein the DMRS in the n subsets of slots are received based on the received n DMRS configurations.

7. The method of claim 1, wherein for each slot of the first subset of slots, the DMRS symbol density is higher for a first portion of the slot than for a second portion of the slot, the second portion being subsequent to the first portion.

8. The method of claim 1, further comprising:
    transmitting, to a base station, a UE capability report including information indicating a UE capability for supporting at least one of a first mode of DMRS bundling or a second mode of DMRS bundling, a single DMRS configuration or multiple DMRS configurations, or specific types of DMRS time domain patterns, wherein the first mode of DMRS bundling corresponds to DMRS being bundled in slots within a window, and the second mode of DMRS bundling corresponds to DMRS being bundled in slots based on and following a received physical downlink control channel (PDCCH) indication, wherein the UE capability report is transmitted separately for each of the UE capabilities or jointly for the UE capabilities, wherein the UE capability report is transmitted within UE assistance information.

9. The method of claim 1, wherein the bundled DMRS are associated with a same phase coherence of transmitted DMRS from a base station.

10. An apparatus for wireless communication of a user equipment (UE), comprising:
    memory; and
    at least one processor coupled to the memory and configured to:
        receive a physical downlink shared channel (PDSCH) and demodulation reference signals (DMRS) in each slot of a plurality of slots, the DMRS being bundled across the plurality of slots, a first subset of slots of the plurality of slots each having a higher DMRS symbol density of DMRS in a time-domain than a second subset of slots of the plurality of slots, the second subset of slots being subsequent to the first subset of slots, wherein the first subset of slots of the plurality of slots is phase-coherent with the second subset of slots of the plurality of slots; and
        decode each received PDSCH based on at least a subset of the received DMRS.

11. The apparatus of claim 10, wherein the first subset of slots of the plurality of slots each have a greater number of symbols carrying DMRS than a second subset of slots of the plurality of slots.

12. The apparatus of claim 10, wherein the first subset of slots includes a first slot of the plurality of slots.

13. The apparatus of claim 12, wherein the second subset of slots includes slots subsequent to the first slot in the plurality of slots.

14. The apparatus of claim 10, wherein the at least one processor is configured to:
    receive a first DMRS configuration and a second DMRS configuration different than the first DMRS configuration, the first DMRS configuration indicating a higher DMRS symbol density than the second DMRS configuration, wherein the DMRS in the first subset of slots are received based on the first DMRS configuration, and the DMRS in the second subset of slots are received based on the second DMRS configuration.

15. The apparatus of claim 10, wherein the plurality of slots includes n subsets of slots, where n≥3, wherein the at least one processor is configured to receive n different DMRS configurations associated with the n subsets of slots, a first DMRS configuration of the n DMRS configurations indicating a higher DMRS symbol density than other DMRS configurations of the n DMRS configurations, wherein the DMRS in the n subsets of slots are received based on the received n DMRS configurations.

16. The apparatus of claim 10, wherein for each slot of the first subset of slots, the DMRS symbol density is higher for a first portion of the slot than for a second portion of the slot, the second portion being subsequent to the first portion.

17. The apparatus of claim 16, wherein the at least one processor is configured to:

transmit, to a base station, a UE capability report including information indicating a UE capability for supporting at least one of a first mode of DMRS bundling or a second mode of DMRS bundling, a single DMRS configuration or multiple DMRS configurations, or specific types of DMRS time domain patterns, wherein the first mode of DMRS bundling corresponds to DMRS being bundled in slots within a window, and the second mode of DMRS bundling corresponds to DMRS being bundled in slots based on and following a received physical downlink control channel (PDCCH) indication, wherein the UE capability report is transmitted separately for each of the UE capabilities or jointly for the UE capabilities, wherein the UE capability report is transmitted within UE assistance information.

18. The apparatus of claim 10, wherein the bundled DMRS are associated with a same phase coherence of transmitted DMRS from a base station.

19. A computer-readable medium storing computer executable code, the code when executed by a processor causes the processor to:

receive a physical downlink shared channel (PDSCH) and demodulation reference signals (DMRS) in each slot of a plurality of slots, the DMRS being bundled across the plurality of slots, a first subset of slots of the plurality of slots each having a higher DMRS symbol density of DMRS in a time-domain than a second subset of slots of the plurality of slots, the second subset of slots being subsequent to the first subset of slots, wherein the first subset of slots of the plurality of slots is phase-coherent with the second subset of slots of the plurality of slots; and decode each received PDSCH based on at least a subset of the received DMRS.

20. A method of wireless communication of a base station, comprising:

determining to transmit bundled demodulation reference signals (DMRS) in a plurality of slots to a UE; and transmitting a physical downlink shared channel (PDSCH) and the DMRS in each slot of the plurality of slots, the DMRS being bundled across the plurality of slots, a first subset of slots of the plurality of slots each having a higher DMRS symbol density of DMRS in a time-domain than a second subset of slots of the plurality of slots, the second subset of slots being subsequent to the first subset of slots, wherein the first subset of slots of the plurality of slots is phase-coherent with the second subset of slots of the plurality of slots.

21. The method of claim 20, wherein the first subset of slots of the plurality of slots each have a greater number of symbols carrying DMRS than a second subset of slots of the plurality of slots.

22. The method of claim 20, wherein the first subset of slots includes a first slot of the plurality of slots.

23. The method of claim 22, wherein the second subset of slots includes slots subsequent to the first slot in the plurality of slots.

24. The method of claim 20, further comprising:

transmitting a first DMRS configuration and a second DMRS configuration different than the first DMRS configuration, the first DMRS configuration indicating a higher DMRS symbol density than the second DMRS configuration, wherein the DMRS in the first subset of slots are transmitted based on the first DMRS configuration, and the DMRS in the second subset of slots are transmitted based on the second DMRS configuration.

25. The method of claim 20, wherein the plurality of slots includes n subsets of slots, where n≥3, the method further comprising:

transmitting n different DMRS configurations associated with the n subsets of slots, a first DMRS configuration of the n DMRS configurations indicating a higher DMRS symbol density than other DMRS configurations of the n DMRS configurations, wherein the DMRS in the n subsets of slots are transmitted based on the transmitted n DMRS configurations.

26. The method of claim 20, wherein for each slot of the first subset of slots, the DMRS symbol density is higher for a first portion of the slot than for a second portion of the slot, the second portion being subsequent to the first portion.

27. The method of claim 20, further comprising:

receiving, from the UE, a UE capability report including information indicating a UE capability for supporting at least one of a first mode of DMRS bundling or a second mode of DMRS bundling, a single DMRS configuration or multiple DMRS configurations, or specific types of DMRS time domain patterns, wherein transmission of the DMRS to the UE is based on the received UE capability report, wherein the first mode of DMRS bundling corresponds to DMRS being bundled in slots within a window, and the second mode of DMRS bundling corresponds to DMRS being bundled in slots based on and following a transmitted physical downlink control channel (PDCCH) indication, wherein the UE capability report is received separately for each of the UE capabilities or jointly for the UE capabilities, wherein the UE capability report is received within UE assistance information.

28. An apparatus for wireless communication of a base station, comprising:

memory; and at least one processor coupled to the memory and configured to:

determine to transmit bundled demodulation reference signals (DMRS) in a plurality of slots to a UE; and transmit a physical downlink shared channel (PDSCH) and the DMRS in each slot of the plurality of slots, the DMRS being bundled across the plurality of slots, a first subset of slots of the plurality of slots each having a higher DMRS symbol density of DMRS in a time-domain than a second subset of slots of the plurality of slots, the second subset of slots being subsequent to the first subset of slots, wherein the first subset of slots of the plurality of slots is phase-coherent with the second subset of slots of the plurality of slots.

29. The apparatus of claim 28, wherein the first subset of slots of the plurality of slots each have a greater number of symbols carrying DMRS than a second subset of slots of the plurality of slots.

30. The apparatus of claim 28, wherein the first subset of slots includes a first slot of the plurality of slots.

31. The apparatus of claim 30, wherein the second subset of slots includes slots subsequent to the first slot in the plurality of slots.

32. The apparatus of claim 28, wherein the at least one processor is configured to:

transmit a first DMRS configuration and a second DMRS configuration different than the first DMRS configuration, the first DMRS configuration indicating a higher DMRS symbol density than the second DMRS configuration, wherein the DMRS in the first subset of slots are transmitted based on the first DMRS configuration, and the DMRS in the second subset of slots are transmitted based on the second DMRS configuration.

33. The apparatus of claim 28, wherein the plurality of slots includes n subsets of slots, where n≥3, wherein the at least one processor is configured to transmit n different DMRS configurations associated with the n subsets of slots, a first DMRS configuration of the n DMRS configurations indicating a higher DMRS symbol density than other DMRS configurations of the n DMRS configurations, wherein the DMRS in the n subsets of slots are transmitted based on the transmitted n DMRS configurations.

34. The apparatus of claim 28, wherein for each slot of the first subset of slots, the DMRS symbol density is higher for a first portion of the slot than for a second portion of the slot, the second portion being subsequent to the first portion.

35. The apparatus of claim 28, wherein the at least one processor is configured to:

receive, from the UE, a UE capability report including information indicating a UE capability for supporting at least one of a first mode of DMRS bundling or a second mode of DMRS bundling, a single DMRS configuration or multiple DMRS configurations, or specific types of DMRS time domain patterns, wherein transmission of the DMRS to the UE is based on the received UE capability report, wherein the first mode of DMRS bundling corresponds to DMRS being bundled in slots within a window, and the second mode of DMRS bundling corresponds to DMRS being bundled in slots based on and following a transmitted physical downlink control channel (PDCCH) indication, wherein the UE capability report is received separately for each of the UE capabilities or jointly for the UE capabilities, wherein the UE capability report is received within UE assistance information.

* * * * *